United States Patent
Terada et al.

(10) Patent No.: US 12,529,848 B2
(45) Date of Patent: Jan. 20, 2026

(54) OPTICAL DEVICE AND WAVELENGTH-TUNABLE LASER

(71) Applicant: FURUKAWA ELECTRIC CO., LTD., Tokyo (JP)

(72) Inventors: Yosuke Terada, Tokyo (JP); Tatsuro Kurobe, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 148 days.

(21) Appl. No.: 18/350,064

(22) Filed: Jul. 11, 2023

(65) Prior Publication Data

US 2023/0350132 A1  Nov. 2, 2023

Related U.S. Application Data

(63) Continuation of application No. PCT/JP2022/004933, filed on Feb. 8, 2022.

(30) Foreign Application Priority Data

Feb. 9, 2021  (JP) .................................. 2021-019346
Jan. 19, 2022  (JP) .................................. 2022-006400

(51) Int. Cl.
*G02B 6/28* (2006.01)
*H01S 5/14* (2006.01)

(52) U.S. Cl.
CPC ............ *G02B 6/2813* (2013.01); *H01S 5/141* (2013.01)

(58) Field of Classification Search
CPC .............................. G02B 6/2813; H01S 5/141
See application file for complete search history.

(56) References Cited

U.S. PATENT DOCUMENTS

| | | | |
|---|---|---|---|
| 5,627,929 | A | 5/1997 | Vawter et al. |
| 2013/0064492 | A1 | 3/2013 | Ishikawa et al. |
| 2019/0258003 | A1 | 8/2019 | Shinohara et al. |
| 2022/0077645 | A1* | 3/2022 | Muranaka ............... H01S 3/063 |

FOREIGN PATENT DOCUMENTS

| | | |
|---|---|---|
| JP | 2011-186258 A | 9/2011 |
| JP | 2012-048036 A | 3/2012 |
| JP | 2012203339 A * | 10/2012 |

(Continued)

OTHER PUBLICATIONS

International Search Report issued May 10, 2022 in PCT/JP2022/004933 filed on Feb. 8, 2022, 3 pages.

(Continued)

*Primary Examiner* — Chad H Smith
(74) *Attorney, Agent, or Firm* — Oblon, McClelland, Maier & Neustadt, L.L.P.

(57) ABSTRACT

An optical device includes: a multi-mode interference waveguide that includes a first end portion in a first direction and a second end portion in opposite direction to the first direction; a first port that is arranged in the first end portion; a second port that is arranged in the first end portion; a third port that is arranged in the second end portion and that is positioned at a center of the second end portion in the second direction; and two fourth ports that are arranged in the second end portion and that are positioned on both sides of the third port in the second direction.

3 Claims, 7 Drawing Sheets

(56) References Cited

FOREIGN PATENT DOCUMENTS

| JP | 2013-93627 A | 5/2013 |
| JP | 2020-177109 A | 10/2020 |
| WO | WO 2018/078992 A1 | 5/2018 |
| WO | 2019-213137 A1 | 11/2019 |
| WO | WO 2020/145173 A1 | 7/2020 |

OTHER PUBLICATIONS

Segawa et al. "Full C-Band Tuning Operation of Semiconductor Double-Ring Resonator-Coupled Laser With Low Tuning Current" IEEE Photonics Technology Letters, 2007, vol. 19, No. 17, 5 pages.
Japanese Office Action dated Nov. 18, 2025 in Japanese Patent Application No. 2022-006400 w/English machine translation, citing documents 1-3 therein, 6 pages.

* cited by examiner

OPTICAL DEVICE AND WAVELENGTH-TUNABLE LASER

CROSS-REFERENCE TO RELATED APPLICATION(S)

This application is a continuation of International Application No. PCT/JP2022/004933, filed on Feb. 8, 2022 which claims the benefit of priority of the prior Japanese Patent Application No. 2021-019346, filed on Feb. 9, 2021 and Japanese Patent Application No. 2022-006400, filed on Jan. 19, 2022, the entire contents of which are incorporated herein by reference.

BACKGROUND OF THE INVENTION

The present disclosure relates to an optical device
In the related art, a wavelength-tunable laser including a ring resonator is known (for example, Japanese Patent Application Laid-open No. 2013-093627). In Patent Literature 1, a 2×2 multi-mode interference (MMI) waveguide is disposed at the junction of a linear waveguide and a ring waveguide.

SUMMARY OF THE INVENTION

In this type of optical devices, it is desirable that the light loss corresponding to a processing error in the multi-mode interference waveguide is as small as possible. Moreover, it is desirable to have a configuration that is capable of suitably processing the stray light generated in the multi-mode interference waveguide.

In that regard, it is desirable to provide an optical device and a wavelength-tunable laser having a new and improved configuration that enables reduction of the light loss and enables appropriate processing of the stray light.

In some embodiments, an optical device includes: a multi-mode interference waveguide that includes a first end portion in a first direction, and a second end portion in opposite direction to the first direction; a first port that is arranged in the first end portion and that is placed away, in a second direction intersecting with the first direction, from a center of the first end portion in the second direction; a second port that is arranged in the first end portion and that is positioned on an opposite side of the first port with respect to the center of the first end portion in the second direction; a third port that is arranged in the second end portion and that is positioned at a center of the second end portion in the second direction; and two fourth ports that are arranged in the second end portion and that are positioned on both sides of the third port in the second direction, the multi-mode interference waveguide being configured such that same-phase components of lights input to the first port and the second port are coupled at the third port, and antiphase components of lights input to the first port and the second port are coupled at the two fourth ports.

In some embodiments, a wavelength-tunable laser includes, as either a filter or a reflecting mirror, one or more of the optical device.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Exemplary embodiments of the disclosure are described below. The configurations explained in the embodiments described below as well as the actions and the results (effects) attributed to the configurations are only exemplary. Thus, the disclosure can be implemented also using some different configuration than the configurations disclosed in the embodiments described below. Meanwhile, according to the disclosure, it becomes possible to achieve at least one of various effects (including secondary effects) that are attributed to the configurations.

The embodiments described below include identical constituent elements. In the following explanation, the identical constituent elements are referred to by the same reference numerals, and their explanation is not given in a repeated manner.

In the present written description, ordinal numbers are assigned only for convenience and with the aim of differentiating among the components, among the parts, and among the directions. Thus, the ordinal numbers do not indicate the priority or the sequencing.

Moreover, in the drawings, a D1 direction is indicated by an arrow D1, a D2 direction indicated by an arrow D2, and the Z direction is indicated by an arrow Z. The D1 direction, the D2 direction, and the Z direction intersect with each other and are orthogonal to each other.

First Embodiment

Figure 1:
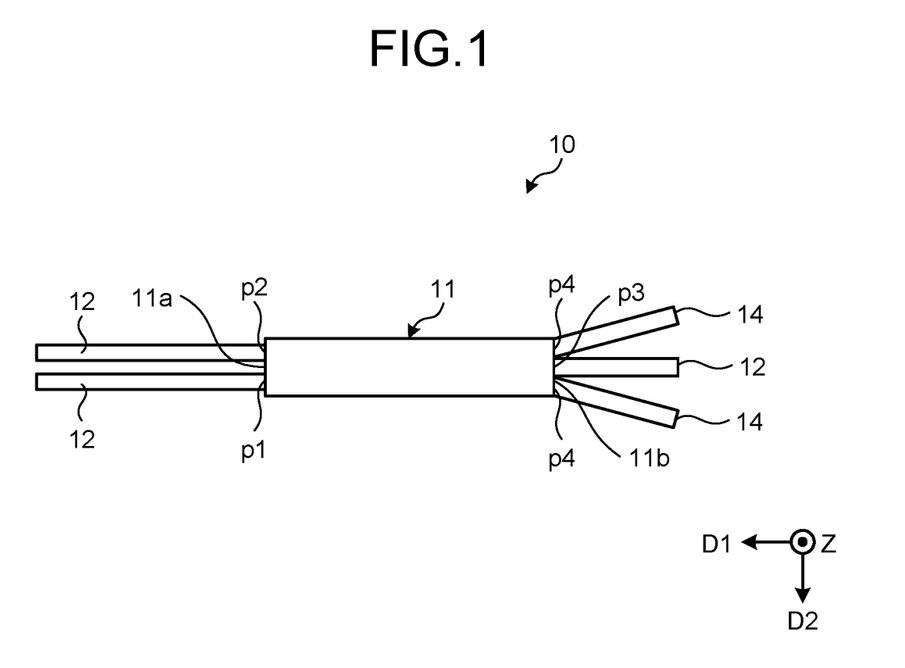
FIG. 1 is an illustrative and schematic planar view of an optical device according to a first embodiment.

FIG. 1 is a planar view of an optical device 10 according to a first embodiment. The optical device 10 includes a multi-mode interference waveguide 11, and includes a plurality of waveguides 12 and 14 that is optically connected to the multi-mode interference waveguide 11 via a plurality of ports p1 to p4. Each of the ports p1, p2, and p3 has the waveguide 12 connected thereto; and each of two ports p4 has a waveguide 14 connected thereto.

The multi-mode interference waveguide 11 has an end portion 11a in the D1 direction and has an end portion 11b in the opposite direction to the D1 direction. Herein, the D1 direction represents an example of a first direction. Moreover, the end portion 11a represents an example of a first end portion, and the end portion 11b represents an example of a second end portion.

The multi-mode interference waveguide 11 includes the port p1 that is placed away, in the D2 direction, from the center of the end portion 11a in the D2 direction. The D2 direction intersects with the D1 direction and represents an example of a second direction. Moreover, the port p1 represents an example of a first port.

The multi-mode interference waveguide 11 includes the port p2 that is placed away, in the opposite direction to the D2 direction, from the center of the end portion 11a in the D2 direction. The port p2 is positioned on the opposite side of the port p1 with respect to the center of the end portion 11a in the D2 direction. The port p2 represents an example of a second port.

The multi-mode interference waveguide 11 includes the port p3 that is placed at the center of the end portion 11a in the D2 direction. The port p3 represents an example of a third port.

The multi-mode interference waveguide 11 according to the first embodiment is configured as a 1×2 multi-mode interference waveguide 11 that outputs the lights input from the ports p1 and p2 to the port p3. The inventors did a thorough study based on simulation and experiments, and found that, as compared to a 2×2 multi-mode interference waveguide, the 1×2 multi-mode interference waveguide 11 has a lower sensitivity to the light loss corresponding to a processing error. That is because, regarding the specifications corresponding to the lights having the same wavelength, as compared to a 1×2 multi-mode interference waveguide, a 2×2 multi-mode interference waveguide has a narrower width in the D2 direction, and it is believed that the effect of the processing error in that width becomes proportionately larger. According to a study done by the inventors, it was found that, in a 2×2 multi-mode interference waveguide, the light loss prominently increases (for example, to around 0.6 dB) corresponding to the processing error of ±50 [nm]. In contrast, in a 1×2 multi-mode interference waveguide having almost identical specifications, it was found that, even at the processing error of ±100 [nm], an increase in the light loss can be held down to a lower level (for example, to around 0.2 dB).

In this way, in the 1×2 multi-mode interference waveguide 11, there is an advantage that the light loss can be held down. However, it is a known fact that, with respect to the light input from the ports p1 and p2, antiphase components arrive on both sides of the end portion 11b in the D2 direction and then reflect inside the multi-mode interference waveguide 11, thereby contributing in the generation of the stray light. The stray light can also be referred to as the unnecessary light.

In that regard, the multi-mode interference waveguide 11 according to the first embodiment includes the ports p4 that are arranged in the end portion 11b and that are positioned on both sides of the port p3 in the D2 direction. The ports p4 represent an example of fourth ports. From the waveguides 14 connected to the ports p4, the stray light can be processed in an appropriate manner.

Regarding the multi-mode interference waveguide 11; the length in the D1 direction, the width in the D2 direction, the side geometry on both sides of the D2 direction, and the shapes of the end portions 11a and 11b in the D1 direction are set in such a way that the lights input to the ports p1 and p2 in the same phase get coupled at the port p3, and that the lights input to the ports p1 and p2 in opposite phases get coupled at the two ports p4.

As explained above, as a result of using the multi-mode interference waveguide 11 according to the first embodiment, the light loss corresponding to a processing error can be held down to a greater extent as compared to a 2×2 multi-mode interference waveguide. Moreover, the multi-mode interference waveguide 11 according to the first embodiment has a more robust configuration. Hence, for example, the individual differences (variability) in the properties of the optical device 10 can be further reduced, and the tolerance can be set to be greater. That enables achieving enhancement in the yield ratio.

Second Embodiment

Figure 2:
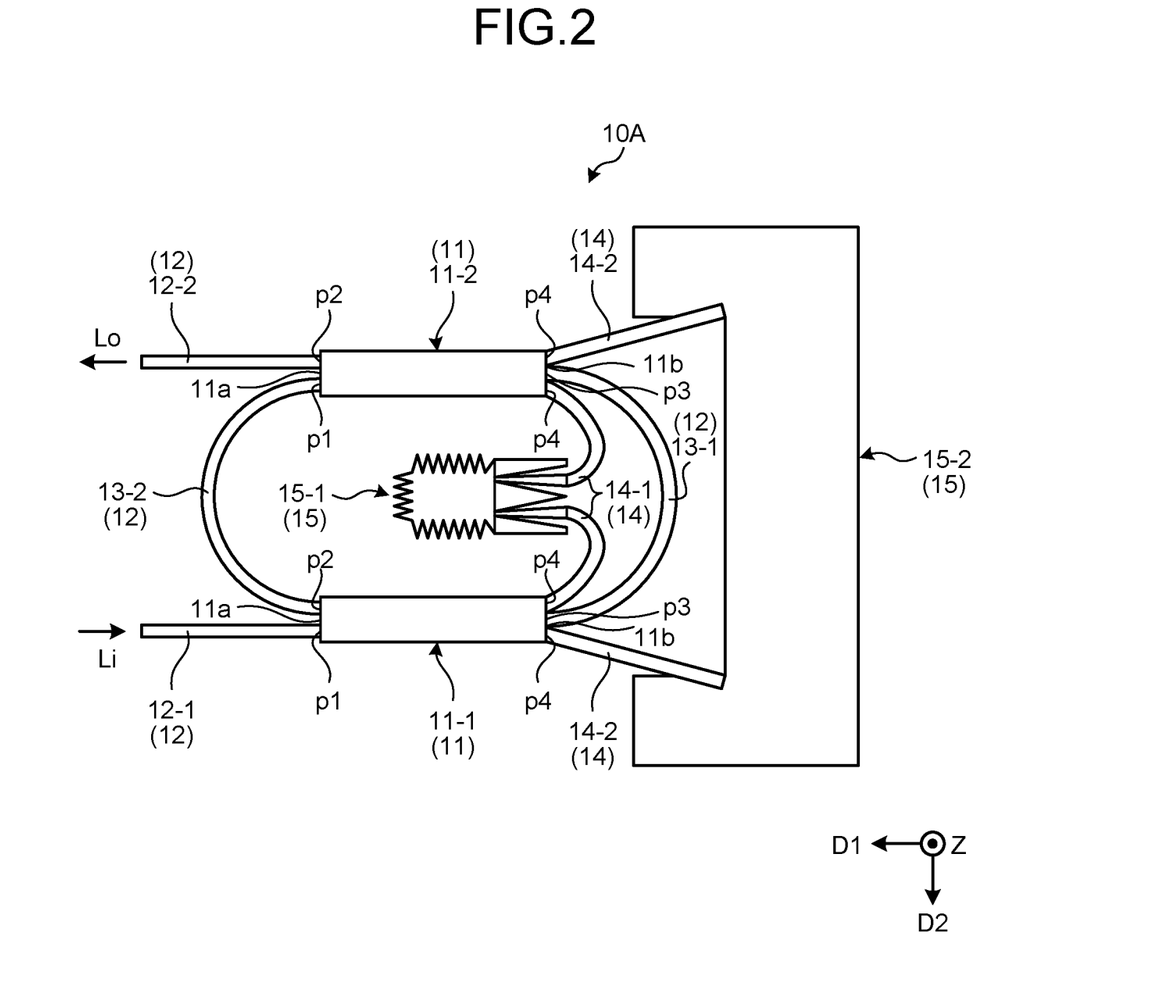
FIG. 2 is an illustrative and schematic planar view of an optical device according to a second embodiment.

FIG. 2 is a planar view of a ring resonator 10A according to a second embodiment. The ring resonator 10A represents an example of an optical device.

As illustrated in FIG. 2, the ring resonator 10A includes two multi-mode interference waveguides 11-1 and 11-2; waveguides 12-1 and 12-2 (12) that are optically connected to the multi-mode interference waveguides 11-1 and 11-2, respectively; and waveguides 13-1 and 13-2 (12) that are optically connected to the multi-mode interference waveguides 11-1 and 11-2, respectively.

Moreover, the ring resonator 10A includes light processing portions 15-1 and 15-2 (15) that process the stray light coming from the multi-mode interference waveguides 11-1 and 11-2.

The two multi-mode interference waveguides 11-1 and 11-2 have an identical configuration to the configuration of the multi-mode interference waveguide 11 according to the first embodiment described above. Moreover, the two multi-mode interference waveguides 11-1 and 11-2 have identical specifications including the length in the D1 direction, the width in the D2 direction, the side geometry on both sides of the D2 direction, the shapes of the end portions 11a and 11b in the D1 direction, and the number and positions of the ports p1 to p4.

The multi-mode interference waveguides 11-1 and 11-2 are disposed parallel to each other while extending in the D1 direction, and are arranged in the D2 direction. The multi-mode interference waveguide 11-2 is separated from the multi-mode interference waveguide 11-1 in the opposite direction to the D2 direction. The multi-mode interference waveguide 11-1 represents an example of a first multi-mode interference waveguide, and the multi-mode interference waveguide 11-2 represents an example of a second multi-mode interference waveguide.

According to the first embodiment, the overall configuration of the ring resonator 10A, which includes two multi-mode interference waveguides 11, a plurality of waveguides 12, and a plurality of light processing portions 15, is axisymmetric with respect to the centerline (not illustrated) that passes through the center of the D2 direction and extends in the D1 direction.

The waveguide 12-1 (12) is optically connected to the port p1 of the multi-mode interference waveguide 11-1. The waveguide 12-1 represents an example of a first waveguide. A laser light Li gets input to the multi-mode interference waveguide 11-1 via the waveguide 12-1 and the port p1.

The waveguide 13-1 (12) is optically connected to the port p3 of the multi-mode interference waveguide 11-1 and to the port p3 of the multi-mode interference waveguide 11-2; and is curved in an arc shape with a substantially constant radius of curvature. The waveguide 13-1 represents an example of a first connection waveguide.

The waveguide 13-2 (12) is optically connected to the port p1 of the multi-mode interference waveguide 11-2 and to the port p2 of the multi-mode interference waveguide 11-1; and is curved in an arc shape with a substantially constant radius of curvature. The radius of curvature of the waveguide 13-2 is set to be slightly smaller than the radius of curvature of the waveguide 13-1. The waveguide 13-2 represents an example of a second connection waveguide.

The waveguide 12-2 (12) is optically connected to the port p2 of the multi-mode interference waveguide 11-2. The waveguide 12-2 represents an example of a second waveguide. A laser light Lo is output from the multi-mode interference waveguide 11-2 via the port p2 and the waveguide 12-1.

Moreover, the multi-mode interference waveguides 11-1 and 11-2 are optically connected to the light processing portions 15-1 and 15-2 via the waveguides 14-1 and 14-2 (14) that are connected to the ports p4.

The light processing portions 15-1 and 15-2 process the stray light coming from the multi-mode interference waveguides 11-1 and 11-2. For example, the light processing portion 15-1 is a slab waveguide leaks the stray light to the outside while dispersing it and scatters the light to the outside from a concavo-convex shape formed in the boundary region with the outside, and is thus capable of processing the stray light. Moreover, for example, the light processing portion 15-2 is a bulk semiconductor or a slab waveguide that is capable of diffusing the stray light in a two-dimensional manner or a three-dimensional manner, and thus leaking the stray light to the outside of the light processing portion 15-2 after lowering the power density of the stray light.

As is clear from FIG. 2, the light processing portion 15-1 is optically connected to the multi-mode interference waveguides 11-1 and 11-2 via such ports p4, from among the ports p4 of the multi-mode interference waveguides 11-1 and 11-2, which are close to each other and via the waveguides 14-1. The light processing portion 15-1 represents an example of a first light processing portion.

The light processing portion 15-2 is optically connected to the multi-mode interference waveguides 11-1 and 11-2 via such ports p4, from among the ports p4 of the multi-mode interference waveguides 11-1 and 11-2, which are distant from each other and via the waveguides 14-2. The light processing portion 15-2 represents an example of a second light processing portion.

That is, in the ring resonator 10A, the light processing portion 15-1 is shared to process the stray light coming from the multi-mode interference waveguide 11-1 and to process the stray light coming from the multi-mode interference waveguide 11-2; and the light processing portion 15-2 is also shared to process the stray light coming from the multi-mode interference waveguide 11-1 and to process the stray light coming from the multi-mode interference waveguide 11-2. With such a configuration, as compared to a configuration in which an individual light processing portion 15 is disposed for each of four ports p4; for example, the device configuration can be simplified and downsized.

The waveguides 14-1 and 14-2 (14) can also be referred to as waste-light waveguides. The direction of extension of the waveguides 14-1 and 14-2 at each port p4 forms an acute angle with the opposite direction to the D1 direction. Hence, at each port p4, it becomes possible to hold down the reflection of the stray light. Moreover, the radius of curvature of the waveguide 14-1 is smaller than the radii of curvature of the waveguides 13-1 and 13-2. Regarding the waveguide 14-1, the radius of curvature is gradually reduced as the distance from the port P4 increases along the clothoid curve. As a result, while holding down an increase in the leakage of the stray light caused due to the bend loss, it becomes possible to set a smaller radius of curvature.

According to the second embodiment, as a result of having a configuration including the waveguides 14-1 and 14-2 (12) and the light processing portions 15-1 and 15-2 (15), the stray light collected from the multi-mode interference waveguides 11-1 and 11-2 can be reflected at a greater distance so as to ensure that the stray light does not easily return to the ring resonator. That enables holding down the adverse effect of the stray light onto the main light in the ring resonator.

Third Embodiment

Figure 3:
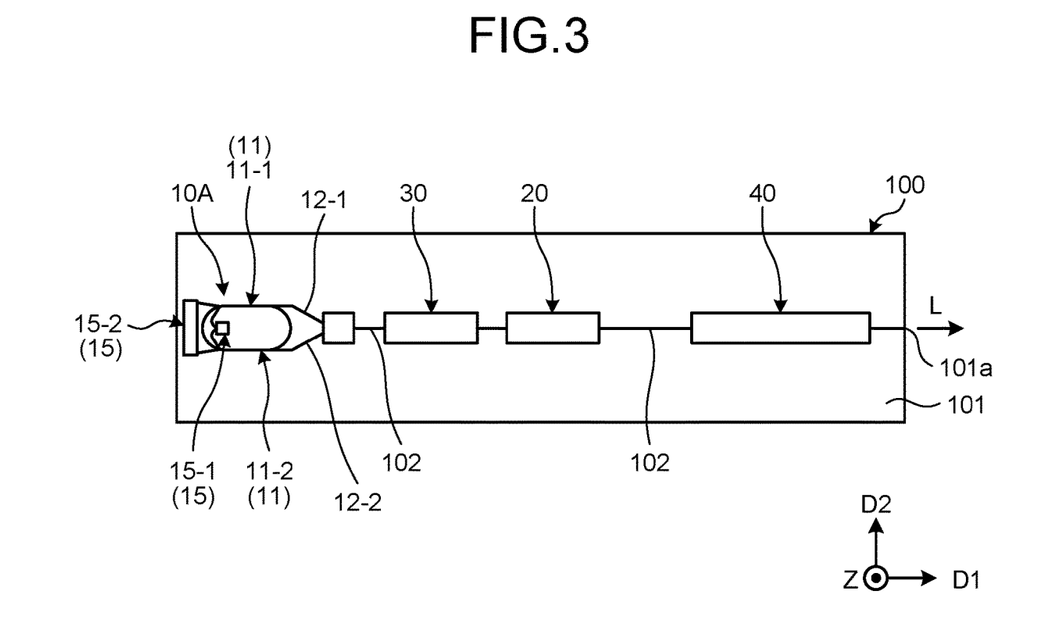
FIG. 3 is an illustrative and schematic planar view of a wavelength-tunable laser according to a third embodiment.

FIG. 3 is a planar view of a laser device 100 according to a third embodiment. As illustrated in FIG. 3, the laser device 100 includes a DBR unit 20, the ring resonator 10A, a gain unit 30, an optical amplifier 40, and a waveguide 102.

The laser device 100 is a semiconductor laser device and represents an example of a wavelength-tunable laser. The laser device 100 is installed in a semiconductor laminate substrate 101, which is configured by laminating a plurality of semiconductor layers on a semiconductor substrate so as to have a predetermined function such as a waveguide.

Each of the DBR unit 20, the ring resonator 10A, the gain unit 30, the optical amplifier 40, and the waveguide 102 is made from an InP system semiconductor material.

The DBR unit 20 includes a waveguide (not illustrated) having a configuration of sampled grading of the distributed Bragg reflection type (SG-DBR). The DBR unit 20 represents an example of a reflecting mirror and can also be referred to as a first reflecting member.

The ring resonator 10A has an identical configuration to the configuration of the ring resonator 10A according to the second embodiment described above. The ring resonator 10A functions as a mirror that undergoes periodic variation in the reflection characteristics with respect to the wavelength of the light input from the waveguide 102. The ring resonator 10A is, for example, a filter or a reflecting mirror; and represents an example of a second reflecting member.

The gain unit 30 includes a waveguide (not illustrated) made from an active layer.

Moreover, the optical amplifier 40 too includes a waveguide (not illustrated) made from an active layer.

In the configuration explained above, the active layer has a multi quantum well (MQW) structure made from, for example, a GaInAsP system semiconductor material or an AlGaInAs system semiconductor material. A passive waveguide is made from, for example, an i-type GaInAsP system semiconductor material having the bandgap wavelength of 1300 nm. An SG-DBR type waveguide is made from, for example, a GaInAsP system semiconductor material or an AlGaInAs system semiconductor material, and the portions having mutually different refraction indexes are placed at regular intervals to form a diffraction grating.

The DBR unit 20 as well as the ring resonator 10A has a microheater (not illustrated) installed therein. The microheater is, what is called, a resistance heating element that produces heat when supplied with an electrical current. In the microheater, a wiring structure including electrodes and conductor layers is disposed for supplying an electrical current.

The DBR unit 20 and the ring resonator 10A constitute a laser resonator. The DBR unit 20 has a comb-shaped reflection peak with a periodic frequency spacing according to the reciprocal of the period of the diffraction grating. In the DBR unit 20 and the ring resonator 10A, that period is different from each other, and the respective configurations enable coarse adjustment of the frequency of the laser light according to a method called a vernier method. When the microheater heats the DBR unit 20, the refractive index of the DBR unit 20 changes. With that, the comb-shaped reflection peak shifts in the frequency axis direction. In an identical manner, when the microheater heats the ring resonator 10A, the refractive index of the ring resonator 10A changes. With that, the comb-shaped reflection peak shifts in the frequency axis direction.

The gain unit 30 is positioned in between the DBR unit 20 and the ring resonator 10A. In other words, the ring resonator 10A is disposed on the opposite side of the DBR unit 20 with respect to the gain unit 30. In the gain unit 30 is disposed a pair of electrodes (not illustrated) that are separated from each other. When a voltage is applied to the pair of electrodes, an electric current flows to the gain unit 30, and the optical amplification effect can be achieved. That results in laser emission.

The optical amplifier 40 is positioned on the opposite of the gain unit 30 and the ring resonator 10A with respect to the DBR unit 20, and is positioned in between the DBR unit 20 and an end portion 101a that serves as the radiation end of the laser light. When a voltage is applied to the optical amplifier 40 via an electrode (not illustrated), an electric current flows to the optical amplifier 40 and the optical amplification result is achieved. The optical amplifier 40 amplifies the laser light that is output from the DBR unit 20 as a result of laser radiation.

The laser device 100 outputs a laser light L, which has been amplified by the optical amplifier 40, from the end portion 101a. The laser light L radiated from the end portion 101a represents the radiated light of the laser device 100.

In the laser device 100, the ring resonator 10A has an identical configuration to the configuration according to the second embodiment described above, and includes the multi-mode interference waveguides 11-1 and 11-1 (11) that are identical to the first embodiment. Thus, in the laser device 100 according to the third embodiment, it becomes possible to achieve identical effects to the effects achieved in the first embodiment and the effects achieved in the second embodiment.

Fourth Embodiment

Figure 4:
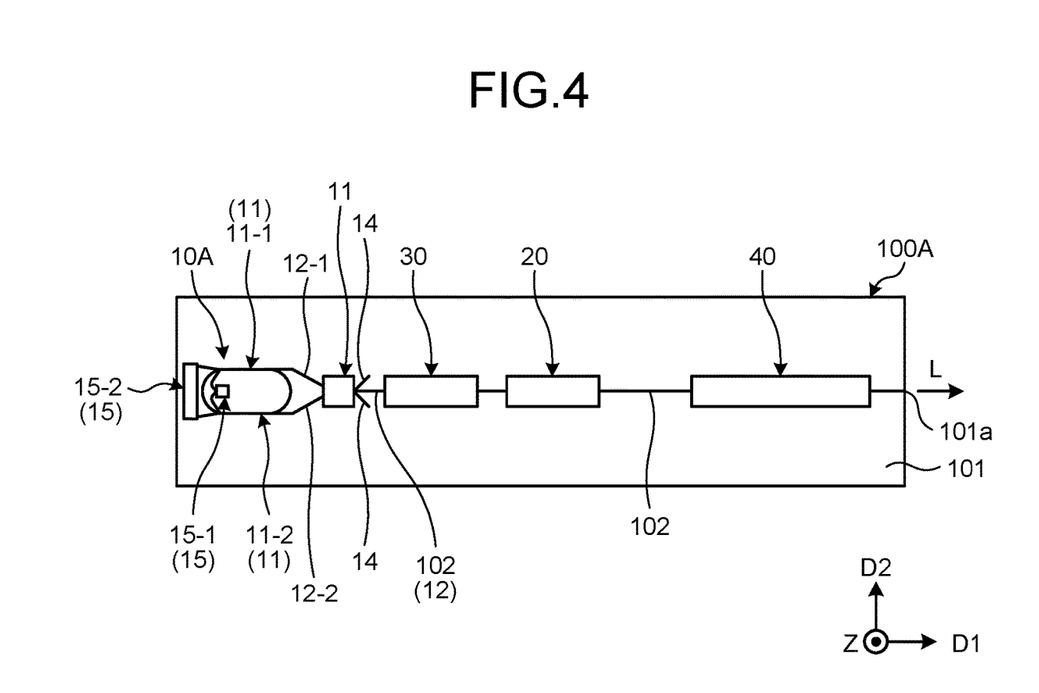
FIG. 4 is an illustrative and schematic planar view of a wavelength-tunable laser according to a fourth embodiment.

FIG. 4 is a planar view of a laser device 100A according to a fourth embodiment. As a result of comparing FIG. 4 with FIG. 3, in the fourth embodiment, it can be seen that the multi-mode interference waveguide 11 identical to the embodiments described above is disposed as a coupler for optically coupling the two waveguides 12-1 and 12-2, which extend from the ring resonator 10A, with the waveguide 102. In that case, in the coupler, it becomes possible to achieve identical effects to the effects achieved in the embodiments described above.

Fifth Embodiment

Figure 5:
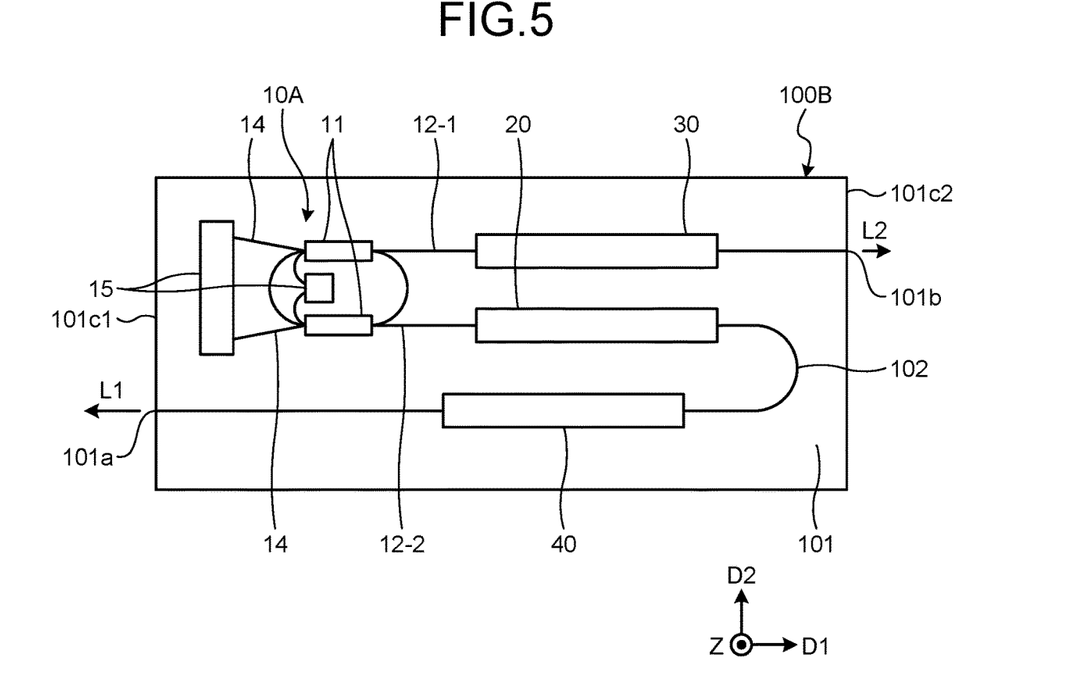
FIG. 5 is an illustrative and schematic planar view of a wavelength-tunable laser according to a fifth embodiment.

FIG. 5 is a planar view of a laser device 100B according to a fifth embodiment. As illustrated in FIG. 5, the laser device 100B according to the fifth embodiment includes the DBR unit 20, the ring resonator 10A, the gain unit 30, the optical amplifier 40, and the waveguide 102 in an identical manner to the laser device 100 according to the third embodiment.

However, in the fifth embodiment, the waveguide 12-1 extending from the ring resonator 10A has the gain unit 30 optically connected thereto, and the other waveguide 12-2 extending from the ring resonator 10A has the DBR unit 20 and the optical amplifier 40 optically connected thereto. On the semiconductor laminate substrate 101; the gain unit 30, the ring resonator 10A, the DBR unit 20, and the optical amplifier 40 are arranged in that order from an end face 101c2 to an end face 101c1 and are optically connected to each other via the waveguide 102. On the end face 101c1, a coating having a relatively lower refractive index is given. On the end face 101c2, a coating having a relatively higher refractive index is given. In that case, with respect to the gain unit 30; the ring resonator 10A and the DBR unit 20 function as a vernier-type emission wavelength selection filter, the DBR unit 20 functions as an anterior reflecting mirror, and the end face 101c2 functions as a posterior reflecting mirror. In such a configuration, the laser light that is output from the constituent elements functioning as a laser unit and disposed in between the end face 101c2 and the DBR unit 20 gets amplified by the optical amplifier 40, and a laser light L1 is output as the output light from the end portion 101a. On the other hand, from the end portion 101b of the end face 101c2, a laser light L2 that is weaker than the laser light L1 is output. The laser light L2 can also be used as the monitor light.

The laser device 100B according to the fifth embodiment includes the ring resonator 10A and the multi-mode interference waveguide 11 in an identical manner to the embodiments described above. Hence, according to the fifth embodiment too, it becomes possible to achieve identical effects to the effects achieved in the embodiments described above.

Sixth Embodiment

Figure 6:
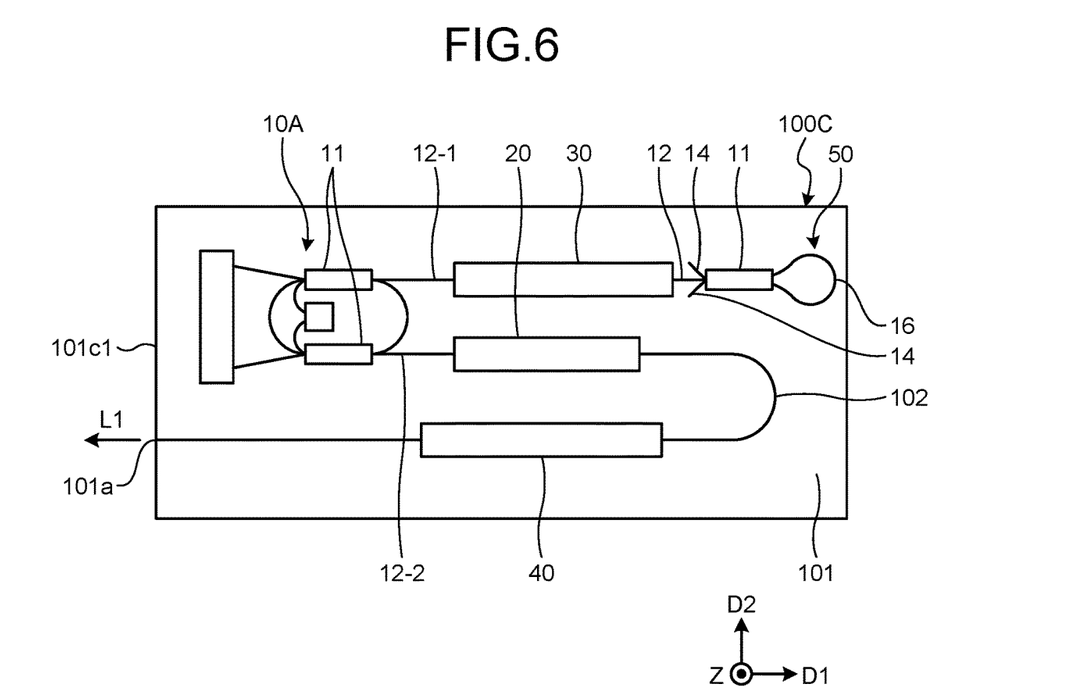
FIG. 6 is an illustrative and schematic planar view of a wavelength-tunable laser according to a sixth embodiment.

FIG. 6 is a planar view of a laser device 100C according to a sixth embodiment. The laser device 100C has an identical configuration to the configuration of the laser device 100B according to the fifth embodiment. As a result of comparing FIG. 6 with FIG. 5, in the sixth embodiment, it can be seen that a loop mirror 50 is disposed as the rear reflecting mirror instead of giving a coating on the end face 101c2.

The loop mirror 50 includes the multi-mode interference waveguide 11. In the multi-mode interference waveguide 11, the two ports on the opposite side of the waveguides 12 and 14 are optically connected to each other via a U-shaped waveguide 16. Such a configuration including the multi-mode interference waveguide 11 and the waveguide 16 functions as a mirror. Herein, the waveguide 16 represents an example of a third connection waveguide.

Moreover, the multi-mode interference waveguide 11 has an identical configuration to the configuration according to the embodiments described above. That is, the multi-mode interference waveguide 11 is configured in such a way that, when the same-phase components of lights are input to the two ports (the first port and the second port) connected to the waveguide 16, the same-phase components get coupled to a port having the waveguide 12 connected thereto (i.e., the third port); and, when the antiphase components of lights are input to the two ports (the first port and the second port) connected to the waveguide 16, the antiphase components are coupled to two ports having the waveguide 14 connected thereto (i.e., two fourth ports). Meanwhile, although not illustrated in FIG. 6, that end portion of the waveguide 14 which is on the opposite side of the multi-mode interference waveguide 11 can be optically connected to the light processing portion 15.

The laser device 100C according to the sixth embodiment too includes the ring resonator 10A, the multi-mode interference waveguide 11, and the waveguide 14 in an identical manner to the embodiments described above. Hence, according to the sixth embodiment too, it becomes possible to achieve identical effects to the effects achieved in the embodiments described above.

Seventh Embodiment

Figure 7:
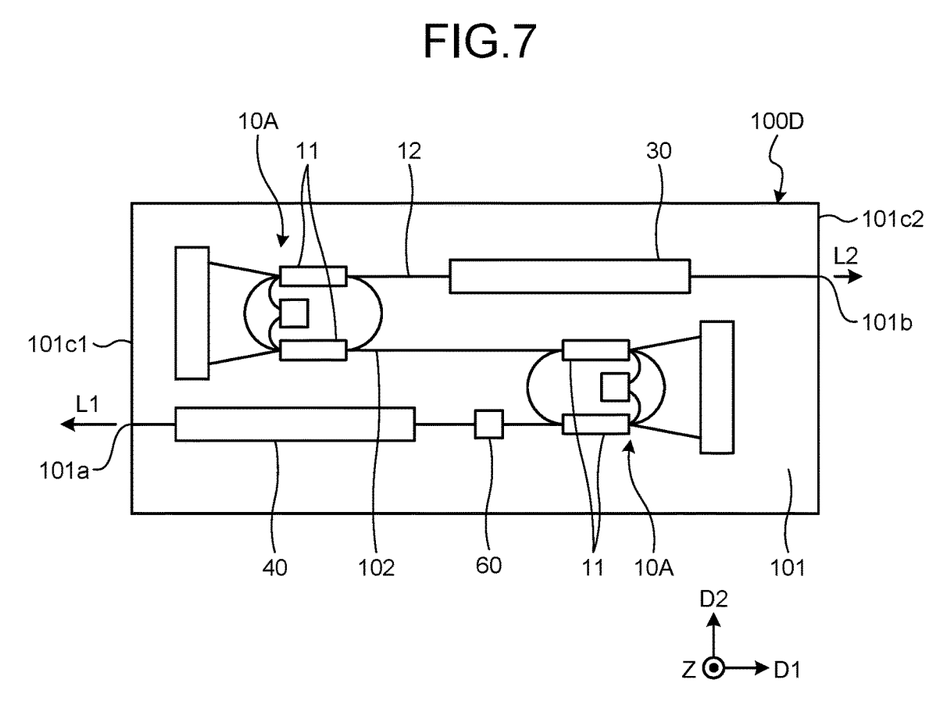
FIG. 7 is an illustrative and schematic planar view of a wavelength-tunable laser according to a seventh embodiment.

FIG. 7 is a planar view of a laser device 100D according to a seventh embodiment. As illustrated in FIG. 7, the laser device 100D according to the seventh embodiment includes two ring resonators 10A, the gain unit 30, the optical amplifier 40, a broadband mirror 60, and the waveguide 102.

The broadband mirror 60 includes a plurality of mirror members for reflecting a laser light corresponding to each different wavelength band. The broadband mirror 60 can be manufactured by performing etching in the semiconductor laminate substrate 101. In that case, the broadband mirror 60 can also be referred to as an etched mirror.

In the seventh embodiment, the gain unit 30, two serial ring resonators 10A, the broadband mirror 60, and the optical amplifier 40 are arranged in that order from the end face 101c2 to the end face 101c1 and are optically connected via the waveguide 102. Moreover, on the end face 101c1, a coating having a relatively lower refractive index is given. Furthermore, on the end face 101c2, a coating having a relatively higher refractive index is given. In that case, with respect to the gain unit 30; the two ring resonators 10A function as vernier-type emission wavelength selection filters, the broadband mirror 60 functions as an anterior reflecting mirror, and the end face 101c2 functions as a posterior reflecting mirror. In such a configuration, the laser light that is output from the constituent elements functioning as a laser unit and disposed in between the end face 101c2 and the broadband mirror 60 gets amplified by the optical amplifier 40, and a laser light L1 is output as the output light from the end portion 101a. On the other hand, from the end portion 101b of the end face 101c2, the laser light L2 that is weaker than the laser light L1 is output. Meanwhile, as a result of using the vernier effect, the period lengths of the two ring resonators 10A are set to be slightly different from each other.

The laser device 100D according to the seventh embodiment too includes the ring resonator 10A and the multi-mode interference waveguide 11 in an identical manner to the embodiments described above. Hence, according to the seventh embodiment too, it becomes possible to achieve identical effects to the effects achieved in the embodiments described above.

Eighth Embodiment

Figure 8:
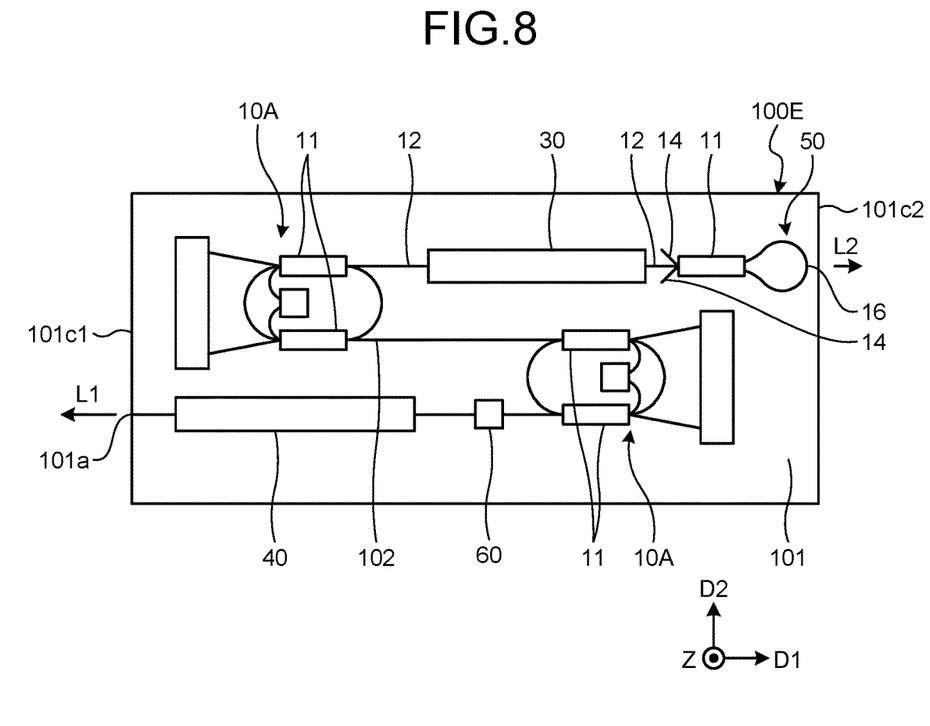
FIG. 8 is an illustrative and schematic planar view of a wavelength-tunable laser according to an eighth embodiment.

FIG. 8 is a planar view of a laser device 100E according to an eighth embodiment. The laser device 100E has an identical configuration to the configuration of the laser device 100D according to the seventh embodiment described above. However, as a result of comparing FIG. 8 with FIG. 7, according to the eighth embodiment, it can be seen that the loop mirror 50 is disposed as the rear reflecting mirror instead of giving a coating on the end face 101c2. The loop mirror 50 has an identical configuration to the configuration according to the sixth embodiment.

The laser device 100E according to the eighth embodiment too includes the ring resonator 10A and the multi-mode interference waveguide 11 in an identical manner to the embodiments described above. Hence, according to the eighth embodiment too, it becomes possible to achieve identical effects to the effects achieved in the embodiments described above.

Ninth Embodiment

Figure 9:
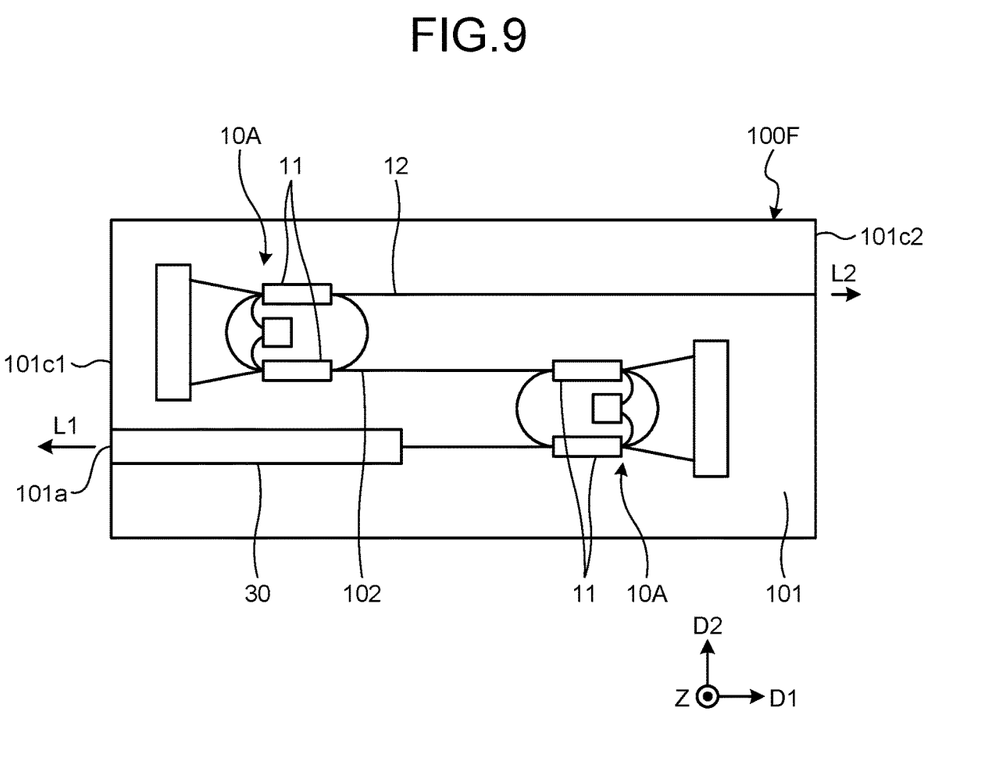
FIG. 9 is an illustrative and schematic planar view of a wavelength-tunable laser according to a ninth embodiment.

FIG. 9 is a planar view of a laser device 100F according to a ninth embodiment. As illustrated in FIG. 9, the laser device 100F according to the ninth embodiment includes the two ring resonators 10A, the gain unit 30, the optical amplifier 40, the broadband mirror 60, and the waveguide 102.

In the ninth embodiment, the two serial ring resonators 10A and the gain unit 30 are arranged in that order from the end face 101c2 to the end face 101c1 and are optically connected via the waveguide 102. Moreover, on the end face 101c1, a coating having a relatively lower refractive index is given. Furthermore, on the end face 101c2, a coating having a relatively higher refractive index is given. In that case, with respect to the gain unit 30; the end face 101c1 functions as an anterior reflecting mirror, the two ring resonators 10A function as vernier-type emission wavelength selection filters, and the end face 101c2 functions as a posterior reflecting mirror. In such a configuration, the laser light L1 that is generated and amplified among the constituent elements functioning as a laser unit and disposed in between the end face 101c2 and the end face 101cl is output as the output light from the end portion 101a. On the other hand, from the end portion 101b of the end face 101c2, the laser light L2 that is weaker than the laser light L1 is output.

The laser device 100F according to the ninth embodiment too includes the ring resonator 10A and the multi-mode interference waveguide 11 in an identical manner to the embodiments described above. Hence, according to the ninth embodiment too, it becomes possible to achieve identical effects to the effects achieved in the embodiments described above.

10-Th Embodiment

Figure 10:
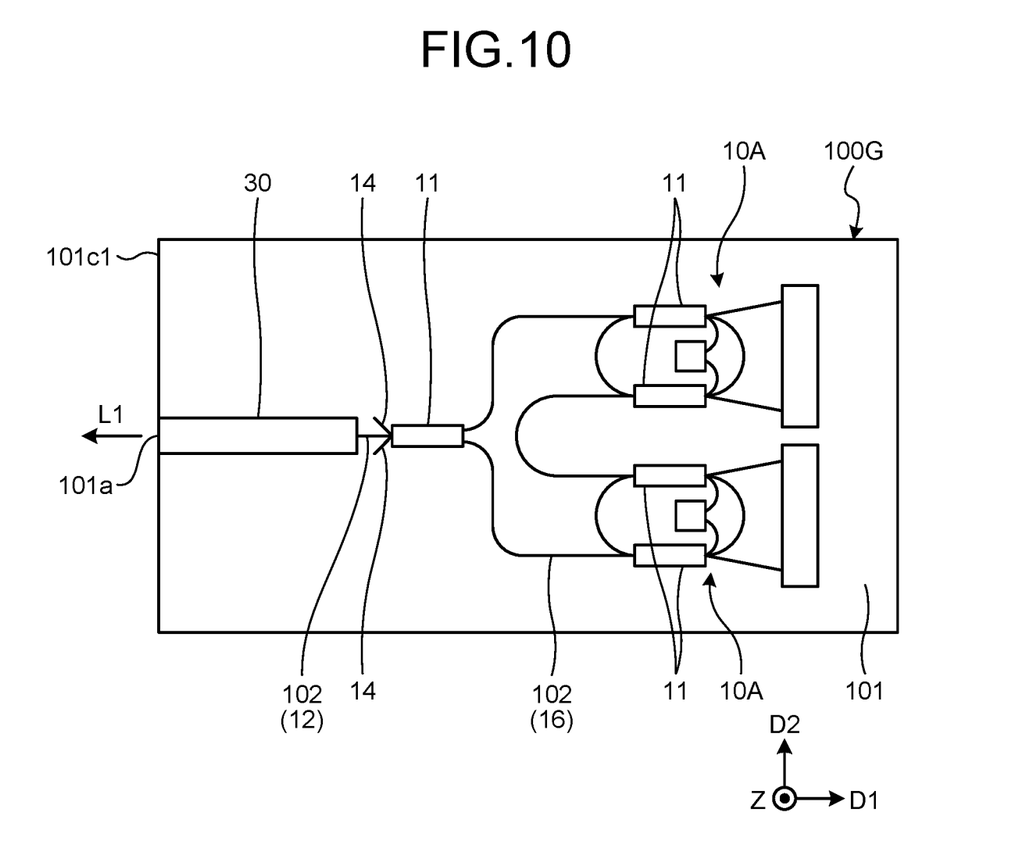
FIG. 10 is an illustrative and schematic planar view of a wavelength-tunable laser according to a 10-th embodiment.

FIG. 10 is a planar view of a laser device 100G according to a 10-th embodiment. As illustrated in FIG. 10, the laser device 100G according to the 10-th embodiment includes the two ring resonators 10A, the gain unit 30, the gain unit 30, and the waveguide 102.

In the multi-mode interference waveguide 11, the two ports on the opposite side of the waveguides 12 and 14 are optically connected via the U-shaped waveguide 102 (16). Such a configuration including the multi-mode interference waveguide 11 and the waveguide 16 functions as a mirror. Moreover, the two ring resonators 10A are optically connected in series via the waveguide 16.

The multi-mode interference waveguide 11 is optically connected to the gain unit 30 via the waveguide 102 (12) and on the opposite side of the waveguide 16. Meanwhile, although not illustrated in FIG. 10, that end portion of the waveguide 14 which is on the opposite side of the multi-mode interference waveguide 11 can be optically connected to the light processing portion 15.

In this case, with respect to the gain unit 30; the end face 101c1 functions as an anterior reflecting mirror, the two ring resonators 10A function as vernier-type emission wavelength selection filters, and the mirror including the multi-mode interference waveguide 11 and the waveguide 16 functions as a posterior reflecting mirror. In such a configuration, the laser light L1 that is generated and amplified among the constituent elements functioning as a laser unit and including the gain unit 30, the multi-mode interference waveguide 11, and the two ring resonators 10A is output as the output light from the end portion 101a.

The laser device 100G according to the 10-th embodiment too includes the ring resonator 10A, the multi-mode interference waveguide 11, and the waveguide 14 in an identical manner to the embodiments described above. Hence, according to the 10-th embodiment too, it becomes possible to achieve identical effects to the effects achieved in the embodiments described above.

While certain embodiments have been described, these embodiments and modification examples have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, regarding the constituent elements, the specifications about the configurations and the shapes (structure, type, direction, shape, size, length, width, thickness, height, number, arrangement, position, material, etc.) can be suitably modified.

According to the disclosure, it becomes possible to provide an optical device and a wavelength-tunable laser having a new and improved configuration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wavelength-tunable laser comprising, as either a filter or a reflecting mirror, one or more of an optical device including:
    a multi-mode interference waveguide that includes:
        a first end portion in a first direction, and a second end portion in a direction opposite to the first direction;
        a first port that is arranged in the first end portion and that is placed away in a second direction intersecting with the first direction, from a center of the first end portion in the second direction;
        a second port that is arranged in the first end portion and that is positioned on an opposite side of the first port with respect to the center of the first end portion in the second direction;
        a third port that is arranged in the second end portion and that is positioned at a center of the second end portion in the second direction;
        two fourth ports that are arranged in the second end portion and that are positioned on both sides of the third port in the second direction; and
    a third connection waveguide that has one end optically connected to the first port, and has another end optically connected to the second port, wherein the multi-mode interference waveguide being configured such that same-phase components of lights input to the first port and the second port are coupled at the third port, and antiphase components of lights input to the first port and the second port are coupled at the two fourth ports.

2. The wavelength tunable laser according to claim 1, further comprising a light processing portion that is optically connected to the fourth ports.

3. An optical device comprising:
    a first multi-mode interference waveguide including:
        a first end portion in a first direction, and a second end portion in a direction opposite to the first direction,
        a first port that is arranged in the first end portion and that is placed away, in a second direction intersecting with the first direction, from a center of the first end portion in the second direction,
        a second port that is arranged in the first end portion and that is positioned on an opposite side of the first port with respect to the center of the first end portion in the second direction,
        a third port that is arranged in the second end portion and that is positioned at a center of the second end portion in the second direction, and
        two fourth ports that are arranged in the second end portion and that are positioned on both sides of the third port in the second direction;
    a second multi-mode interference waveguide that is disposed at a distance from the first multi-mode interference waveguide in a direction opposite to the second direction, the second multi-mode interference waveguide including:
        a third end portion in a first direction, and a fourth end portion in a direction opposite to the first direction,
        a fifth port that is arranged in the third end portion and that is placed away, in the second direction, from a center of the third end portion in the second direction,
        a sixth port that is arranged in the third end portion and that is positioned on an opposite side of the fifth port with respect to the center of the third end portion in the second direction;
        a seventh port that is arranged in the fourth end portion and that is positioned at a center of the fourth end portion in the second direction; and
        two eighth ports that are arranged in the fourth end portion and that are positioned on both sides of the seventh port in the second direction;
    a first waveguide that is optically connected to a first port of the first multi-mode interference waveguide;
    a first connection waveguide that optically connects the third port of the first multi-mode interference waveguide and the seventh port of the second multi-mode interference waveguide, and has a curved shape;
    a second connection waveguide that optically connects the fifth port of the second multi-mode interference waveguide and the second port of the first multi-mode interference waveguide, and has a curved shape;
    a second waveguide that is optically connected to the sixth port of the second multi-mode interference waveguide;
    a first light processing portion;
    a fourth waveguide that optically connects one of the two fourth ports of the first multi-mode interference waveguide and the first light processing portion, the one of the two fourth ports of the first multi-mode interference waveguide being closer to the second multi-mode interference waveguide, and has a curved shape; and
    a fifth waveguide that optically connects one of the two eighth ports of the second multi-mode interference waveguide and the first light processing portion, the one of the two eighth ports of the second multi-mode interference waveguide being closer to the first multi-mode interference waveguide, and has a curved shape, wherein:

the first multi-mode interference waveguide is configured such that same-phase components of lights input to the first port and the second port are coupled at the third port, and antiphase components of lights input to the first port and the second port are coupled at the two fourth ports, the second multi-mode interference waveguide is configured such that same-phase components of lights input to the fifth port and the sixth port are coupled at the seventh port, and antiphase components of lights input to the fifth port and the sixth port are coupled at the two eighth ports, a radius of curvature of the fourth waveguide is smaller than a radius of curvature of the first connection waveguide, is smaller than a radius of curvature of the second connection waveguide, and is reduced as a distance from the one of the two fourth ports increases along a clothoid curve, and a radius of curvature of the fifth waveguide is smaller than a radius of curvature of the first connection waveguide, is smaller than a radius of curvature of the second connection waveguide, and is reduced as a distance from the one of the two eighth ports increases along a clothoid curve.

\* \* \* \* \*